US011257386B1

(12) United States Patent
Ray (10) Patent No.: US 11,257,386 B1
(45) Date of Patent: Feb. 22, 2022

(54) CAMERA-BASED ANGLE TRACKING OF SWARMS FOR COLLISION AVOIDANCE

(71) Applicant: The Boeing Company, Chicago, IL (US)

(72) Inventor: Gary A. Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 16/540,948

(22) Filed: Aug. 14, 2019

(51) Int. Cl.
*H04N 7/18* (2006.01)
*G08G 5/00* (2006.01)
*G08G 5/04* (2006.01)

(52) U.S. Cl.
CPC ......... *G08G 5/0078* (2013.01); *G08G 5/0013* (2013.01); *G08G 5/0021* (2013.01); *G08G 5/0026* (2013.01); *G08G 5/0052* (2013.01); *G08G 5/0082* (2013.01); *G08G 5/045* (2013.01)

(58) Field of Classification Search
None
See application file for complete search history.

(56) References Cited

U.S. PATENT DOCUMENTS

| 2011/0125349 | A1 | 5/2011 | Ace | |
| 2012/0200447 | A1* | 8/2012 | Vacanti | G01S 7/415 342/29 |
| 2014/0043481 | A1* | 2/2014 | Tillotson | G06T 7/20 348/144 |
| 2016/0282131 | A1* | 9/2016 | Palfreyman | G08G 5/0052 |
| 2018/0164431 | A1 | 6/2018 | Kalyandurg et al. | |
| 2020/0064465 | A1* | 2/2020 | Nohara | G01S 13/726 |

FOREIGN PATENT DOCUMENTS

| EP | 2883209 A2 | 6/2015 |
| EP | 3299299 A1 | 3/2018 |
| WO | 2010023253 A1 | 3/2010 |

OTHER PUBLICATIONS

Extended European Search Report dated Dec. 16, 2020 in European Patent Application No. 20188784.1 (European counterpart to the instant U.S. patent application).

(Continued)

*Primary Examiner* — Brent Swarthout
(74) *Attorney, Agent, or Firm* — Ostrager Chong Flaherty & Broitman P.C.

(57) ABSTRACT

Systems and methods for tracking swarms of flying objects for collision avoidance using area-scanning optical systems. Images of the volume of space forward of an aircraft in flight are captured using one or more cameras and then the images are processed to determine whether the image data indicates the presence of a swarm. The camera-based collision avoidance system is configured to detect and angularly track small objects flying in a swarm at sufficiently far ranges to cue or alert the flight control system onboard an autonomous or piloted aircraft to avoid the swarm. A swarm angle tracking algorithm is used to recognize swarms of flying objects that move in unison in a certain direction by detecting a consistent characteristic of the pixel values in captured images which is indicative of swarm motion.

20 Claims, 6 Drawing Sheets

(56) References Cited

OTHER PUBLICATIONS

Dash et al., "Counting Large Flocks of Birds Using Videos Acquired with Hand-Held Devices", Nov. 23, 2017 (Nov. 23, 2017), Big Data Analytics in the Social and Ubiquitous Context: 5th International Workshop on Modeling Social Media, MSM 2014, 5th International Workshop on Mining Ubiquitous and Social Environments, MUSE 2014 and First International Workshop on Machine LE.

Budgey, "Three Dimensional Bird Flock Structure and Its Implications for Bird-Strike Tolerance in Aircraft," Intl. Bird Strike Committee IBSC 24/WP 29 Stara Lesna, Slovakia, Sep. 14-18, 1998.

Raytheon, "Amazing new technology allows drones to flock together as they fly", https://www.raytheon.com/news/feature/mind-swarm, Oct. 4, 2018.

Yong, "Autonomous drones flock like birds", Nature, Feb. 24, 2014.

\* cited by examiner

CAMERA-BASED ANGLE TRACKING OF SWARMS FOR COLLISION AVOIDANCE

BACKGROUND

This disclosure generally relates to systems and methods for avoiding collisions between swarms of small flying objects (such as drones or birds) and an aircraft. More particularly, this disclosure relates to analyzing images captured by one or more cameras to identify situations in which a swarm is in the flight path of an aircraft.

Detecting and tracking flying objects that an aircraft might collide with is an important safety problem. The most important objects that provide no tracking information are disabled/non-cooperative aircraft, small drones and birds. While the first object type can be detected reliably with radar, the other two types cannot be detected reliably due to their small size and lack of strong reflecting material. Cameras by contrast can detect and track small drones and birds reliably under conditions of good visibility as long as their range is not too large. Such camera systems may use both ground- and aircraft-based systems and may be based on single camera tracking or dual (stereoscopic) camera tracking. Single camera systems track by angle (azimuth and elevation) alone, while stereoscopic systems also track by range.

The main problem with camera tracking of small objects such as birds and drones (whether visible or infrared or multispectral) is that the resolution is typically insufficient for detection and tracking at ranges of interest (several miles away). At these ranges, birds and small drones are less than a pixel in size. Thus, tracking of individual objects of this type is unreliable.

SUMMARY

The subject matter disclosed in some detail below is directed to systems and methods for tracking swarms of flying objects for collision avoidance using area-scanning optical systems (they may involve visible or infrared or multispectral imaging). In accordance with some embodiments, images of a volume of space forward of an aircraft in flight are captured using one or more cameras and then the images are processed to determine whether the image data indicates the presence of a swarm. Camera systems have the advantage that they are completely passive, thus eliminating concerns of interference or the need for operating licensing at particular airports. (As used herein, the term "camera" means a video camera.) The camera-based collision avoidance system may be situated on the ground or on an aircraft.

In accordance with one embodiment, the camera-based collision avoidance system is configured to detect and angularly track small objects flying in a swarm at sufficiently far ranges to cue or alert the flight control system onboard an autonomous or piloted aircraft to avoid the swarm. The swarm angle tracking technology disclosed herein is able to recognize swarms of flying objects that move in unison in a certain direction by detecting that a multiplicity of pixel values in the same region (referred to herein as a "subarray") of a sequence of image frames change over time in a manner that is indicative of swarm motion (e.g., flying in formation).

The swarm detection and tracking method proposed herein (hereinafter "swarm angle tracking") is able to track objects that have a very low feature-to-noise ratio (a pixel that images the object has a color that is very little different from a pixel that does not have the object present). The swarm angle tracking method disclosed herein is also able to track objects through difficult background clutter. The swarm angle tracking method is further able to track a swarm of small flying objects without forming individual tracks from each object, thus increasing the reliability of the tracking. These features may provide benefits to ground- and aircraft-based collision avoidance sensor systems by enlarging the detection and tracking range and enabling collision alerts to be more reliable and more timely. Providing a more timely alert of potential collision for aircraft that are about to take off could prevent collisions without the need for avoidance maneuvers. Alternatively, aircraft in the air would have a longer warning time period, which would allow for a safer slower avoidance maneuver as well as providing more time to alert other aircraft about the detected objects.

Although various embodiments of systems and methods for tracking swarms of flying objects for collision avoidance are described in some detail later herein, one or more of those embodiments may be characterized by one or more of the following aspects.

One aspect of the subject matter disclosed in detail below is a system for warning a pilot of a risk of collision during flight of an aircraft, the system comprising: a camera system having a viewpoint and a field of view that includes a volume of space forward of an aircraft in flight, the camera system being configured to capture frames of pixel data representing successive images of objects in a volume of space in response to activation of an image acquisition mode; an alert system on a flight deck of the aircraft capable of generating an alert; and a computer system configured to perform operations comprising: (a) processing the frames to determine whether the pixel data is indicative of the presence of a swarm of flying objects in the volume of space or not; (b) determining a current angular velocity and a current angular position of the swarm based on the pixel data in response to a determination in processing operation (a) that a swarm is present; (c) extrapolating a future angular position of the swarm based on the current angular velocity and current angular position of the swarm; (d) determining whether the future angular position of the swarm is within an angular collision region or not; and (e) triggering the alert system to produce an alert following a determination in operation (d) that the future angular position of the swarm is within the angular collision region. In accordance with one embodiment, the computer system is further configured to determine whether a future time of intersection of the swarm and the aircraft is greater than a minimum time for collision avoidance, in which case operation (e) comprises triggering the alert system if the future angular position of the swarm is within the angular collision region and if the future time of intersection is greater than the minimum time for collision avoidance.

In accordance with one proposed implementation, operation (a) comprises gridding each frame of pixel data into an array of subarrays, a size of each subarray being equal to a specified angular size of a typical swarm. Then for each subarray, operation comprises: extracting pixel values from a sequence of frames to form a swarm window; selecting a sequence of pixel angular velocities; computing a swarm detection metric for each pixel angular velocity selected; comparing each swarm detection metric to a specified threshold that gives a desired false alarm rate; and producing a signal indicating that a swarm has been detected to the alert activation module for each detected swarm, wherein the signal produced includes first digital data representing the angular position of a subarray containing pixels representing the swarm detected and second digital data representing an angular velocity of the pixels representing the swarm detected.

Another aspect of the subject matter disclosed in detail below is a method for warning a pilot of a risk of collision during flight of an aircraft, the method comprising: (a) capturing frames of pixel data representing successive images of objects in a volume of space using at least one camera; (b) processing the frames in a computer system to determine whether the pixel data is indicative of the presence of a swarm of flying objects in the volume of space or not; (c) determining a current angular velocity and a current angular position of the swarm based on the pixel data in response to a determination in step (b) that a swarm is present; (d) extrapolating a future angular position of the swarm based on the current angular velocity and current angular position of the swarm; (e) determining whether the future angular position of the swarm is within an angular collision region or not; and (f) producing an alert following a determination in step (e) that the future angular position of the swarm is within the angular collision region.

A further aspect of the subject matter disclosed in detail below is an aircraft comprising: a camera directed in a forward direction along a centerline of the aircraft and having a field of view that includes a volume of space that is forward of the aircraft during flight, the camera being configured to capture frames of pixel data representing successive images of objects in the volume of space in response to activation of an image acquisition mode; a flight deck of the aircraft comprising an alert system capable of generating an alert; and a computer system configured to perform operations comprising: (a) processing frames received from the camera to determine whether the pixel data is indicative of the presence of a swarm of flying objects in the volume of space or not; (b) determining a current angular velocity and a current angular position of the swarm based on the pixel data in response to a determination in processing operation (a) that a swarm is present; (c) extrapolating a future angular position of the swarm based on the current angular velocity and current angular position of the swarm; (d) determining whether the future angular position of the swarm is within an angular collision region or not; and (e) triggering the alert system to produce an alert following a determination in operation (d) that the future angular position of the swarm is within the angular collision region.

Other aspects of systems and methods for tracking swarms of flying objects for collision avoidance are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, systems and methods for tracking swarms of flying objects for collision avoidance will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The innovative technology disclosed in some detail hereinafter addresses concerns relating to in-air collisions of aircraft with small objects such birds and small drones (typically quadcopters). These two types of objects have many similarities: (1) Birds and small drones are individually similar in size and weight and therefore represent similar dangers to an aircraft. (2) Birds and small drones pose a hazard when flying in a formation (as part of a flock or swarm). (3) Birds and small drones are warmer than the sky in the background and thus detectable using infrared imaging.

In addition, there is a similarity between how an area-scanning imager (e.g., a camera) would be able to detect small drones and birds. In visible light, a bird or small drone at a great distance would appear as a moving speck, wherein its color would typically be darker than the sky color in visible light. In the case of infrared imaging, a bird or drone at a great distance would appear as a moving speck, where its color (temperature) would be lighter than the sky color in infrared light. In addition, a formation or swarm of flying objects of either type would appear to be similar at a great distance and require similar detection and tracking approaches. In either case (birds or small drones), the basic problem of detection and tracking is the same and its performance would be highly dependent on the size and difference between the color of the object and the color of the background, as well as dependent on the size of the swarm.

Figure 1:
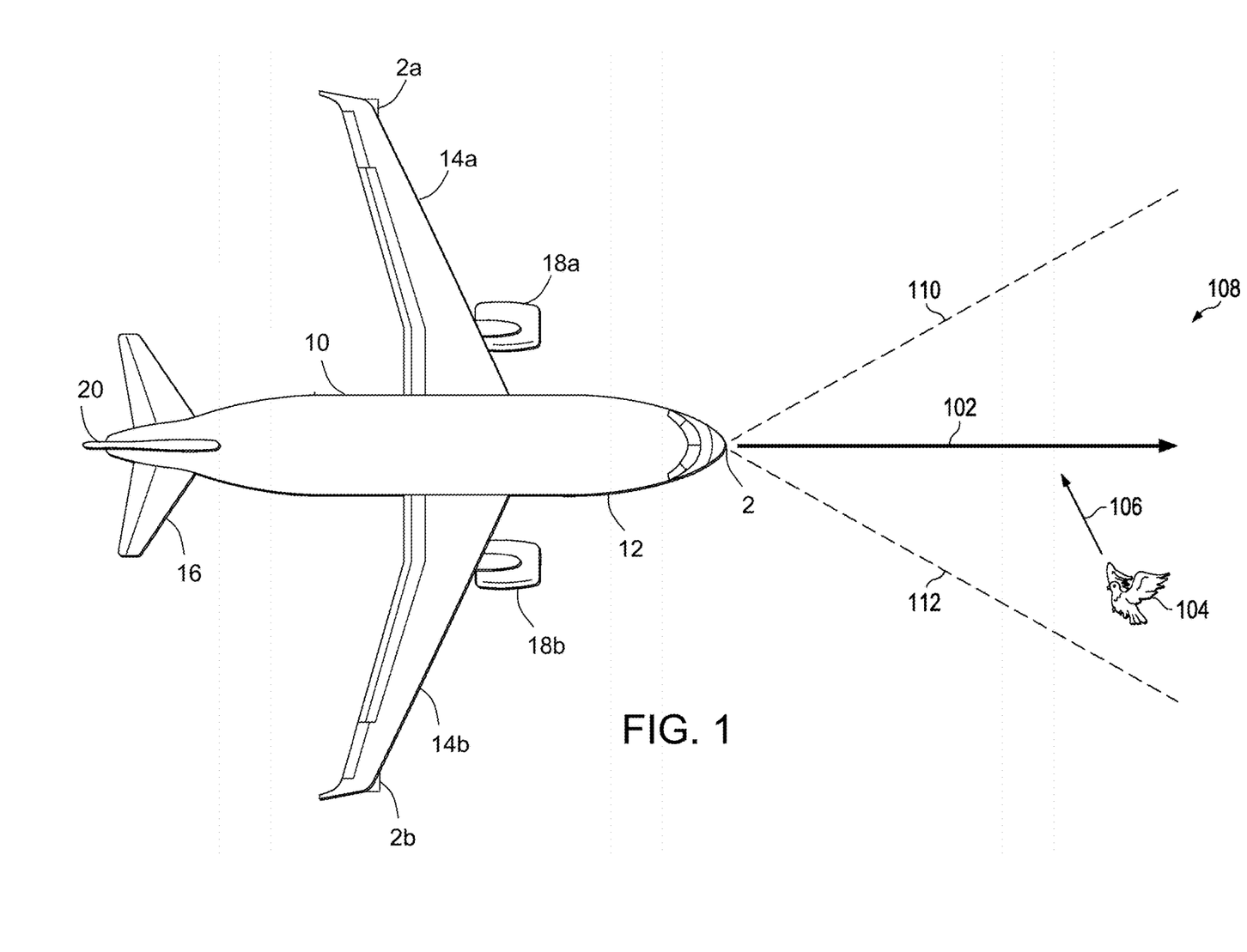
FIG. 1 is a diagram representing a top view of an aircraft showing possible locations of cameras for on-aircraft object detection and tracking in accordance with two embodiments.

FIG. 1 is a diagram showing an aircraft 10 and a bird 104 in flight. The aircraft 10 includes a fuselage 12, a pair of wings 14a and 14b, a horizontal stabilizer 16, a pair of engines 18a and 18b and a vertical stabilizer 20. In the example depicted in FIG. 1, the aircraft 10 may be moving in flight in the direction indicated by an arrow 102. The bird 104 may be moving in flight in the direction indicated by arrow 106. The aircraft 10 and bird 104 are not shown to scale in FIG. 1. Depending on the positions and relative movements of aircraft 10 and bird 104, the bird 104 may strike the aircraft 10. The bird 104 may be a member of a swarm of similar birds that consistently fly in formation, in which case the aircraft 10 could collide with a multitude of birds. The camera-based technology proposed herein is designed to detect a swarm in motion in sufficient time to alert the flight crew to perform a collision avoidance maneuver FIG. 1 shows possible positions for cameras mounted to the aircraft 10. In accordance with one embodiment, a forward-facing video camera 2 (hereinafter "camera 2") is mounted in the nose of the aircraft 10. Camera 2 points in the forward direction indicated by arrow 102 with a field of view 108. In accordance with alternative embodiments, the camera system in the nose of the aircraft 10 may include multiple video cameras with field of view 108. In this example, field of view 108 is defined by a volume of space (e.g., generally conical) in front of the aircraft 10 between dashed lines 110 and 112/In the case of a conical volume, the axis of the cone may be coaxial with the direction of movement of aircraft 10. The video images from a camera system on aircraft 10 may be used to determine whether the bird 104 is likely to strike, or has struck, aircraft 10. Further, the video images from the camera system may be used to identify various characteristics of the bird strike. Bird 104 is within field of view 108. Therefore, video images from the camera system on aircraft 10 will include images of bird 104. In accordance with an alternative embodiment, a pair of forward-facing stereoscopic cameras 2a and 2b are mounted in the leading edges of the tips of the wings 14a and 14b respectively. The stereoscopic cameras 2a and 2b may be arranged with at least partially overlapping fields of view. However, a pair of stereoscopic cameras could be mounted elsewhere on the aircraft 10 for the purpose of tracking swarms while flying.

In accordance with the illustrative embodiment depicted in FIG. 1, the video frames from the camera system onboard the aircraft 10 may be processed to identify the images of the bird 104 if the bird is sufficiently close to the aircraft. However, if the bird 104 is far away, then the image of the bird 104 may occupy no more than a single pixel in the video frame. The situation becomes more complicated when the bird 104 is a member of a swarm of birds located far away and in front of the aircraft.

The system proposed herein uses swarm tracking technology to detect and track a swarm in angle. In alternative embodiments, this swarm angle tracking may be supplemented by deriving range (the distance separating the aircraft and the swarm) to help improve the swarm tracking. In accordance with some embodiments, one or more video cameras onboard the aircraft 10 acquire frames of image data which are processed to detect the presence of a swarm of small flying objects, determine the likelihood of a collision with that swarm and then issue an alert to the pilot in the event that the likelihood of a collision exceeds a specified threshold. In accordance with further alternative embodiments, one or more cameras may be mounted on towers situated near a runway. In the latter case, the video images may be processed on the ground by a computer system that is configured (e.g., programmed) to issue an alert to the aircraft when an arriving or departing aircraft may be in danger of colliding with a swarm.

Figure 2:
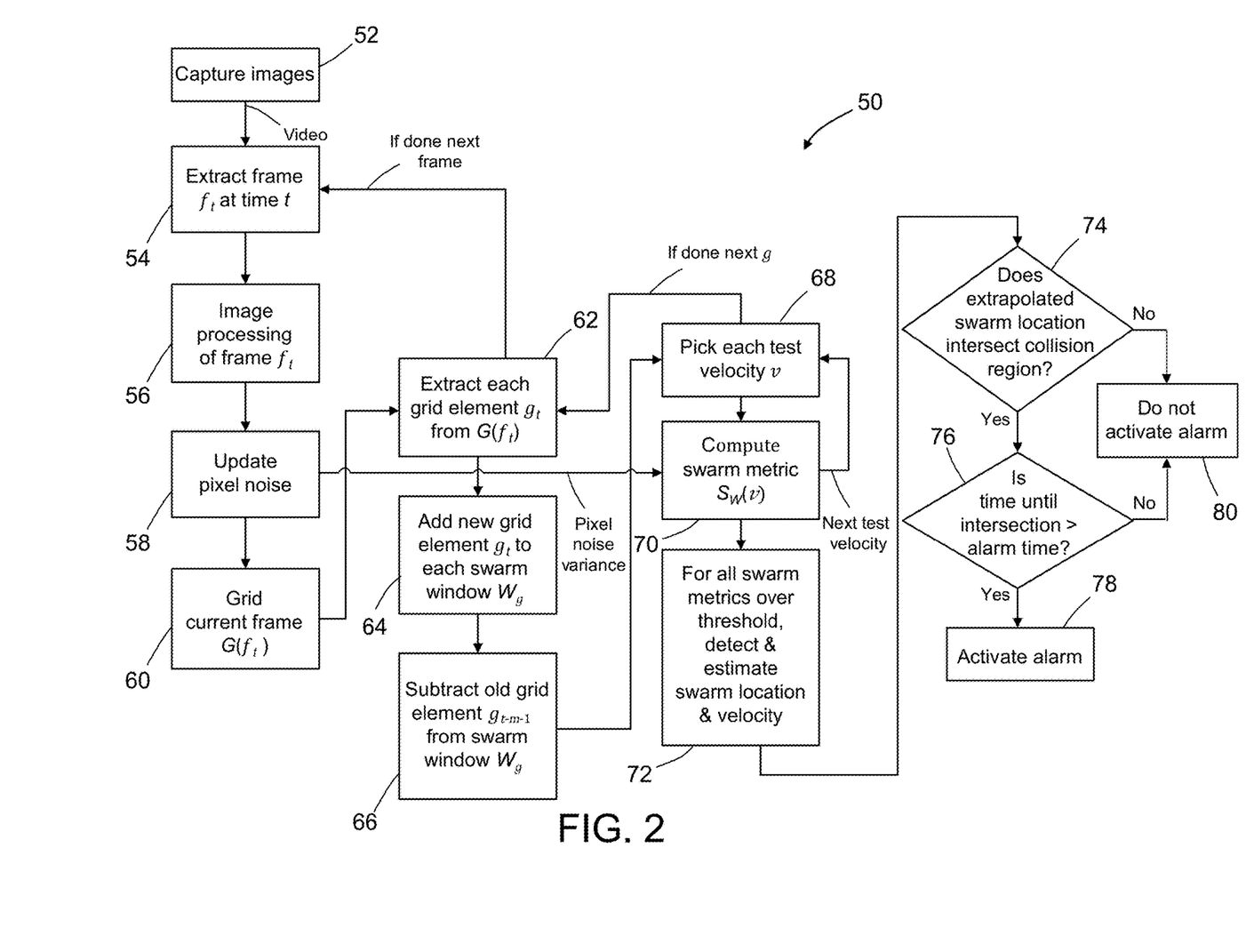
FIG. 2 is a flowchart identifying steps of a swarm angle tracking algorithm in accordance with one embodiment.

FIG. 2 is a flowchart identifying steps of a swarm angle tracking algorithm 50 in accordance with one embodiment. As the aircraft flies along a flight path, a video camera (mounted to the aircraft or a tower at an airport) continually captures images of a volume of space forward of the present position of the aircraft (step 52). The video camera may be configured to detect visible light, infrared radiation or multispectral wavebands and output frames at the camera's frame rate. The resulting video stream of images is then sent to a machine vision processing unit which performs the other steps identified in FIG. 2.

The machine vision processing unit extracts frame $f_t$ at time t (step 54). Each frame consists of a two-dimensional array of pixel values. These values could be either single integers c indicating intensity at some optical frequency, or a vector consisting of a set of integers representing the intensities of respective colors, e.g., c=(red, green, blue).

The extracted frame $f_t$ then undergoes image preprocessing (step 56). There are many different possible image preprocessing steps that can be used in order to enhance camera resolution, reduce artifacts, fix bad pixels, compute image gradient, etc. Image preprocessing also includes image registration with the previous frame $f_{t-1}$ in the case of camera motion (if mounted on an aircraft rather than on a tower at an airport).

Next the machine vision processing unit updates pixel noise by updating the pixel variance based on a time window (step 58). If frame $f_t$ is a two-dimensional pixel array C={$c_{ij}(t)$}, where i=1, ..., N and j=1, ..., M vary over the size of the N×M array at time t, the pixel variance update is computed using a window technique similar to the window technique described in U.S. Pat. No. 10,305,701, but modified for image frames to eliminate non-noise image changes due to moving objects. The machine vision processing unit computes a sequence of variances {(t)²} for each pixel over a time window of length m based on the following two iterative equations for an input pixel sequence {c(t)}:

$$S(t)=S(t-1)+c(t)-c(t-m)$$

$$\sigma^2(t)=\sigma^2(t-1)+c(t)(c(t)-S(t-1))-c(t-m)(S(t)-c(t-m))$$

This gives a variance for each of the N×M pixels in a frame. The final pixel noise estimate then computes $\mu(\sigma_{ij}(t)^2)$, the mean over all the pixels i, j in the current frame, and then the mean above the mean $$\mu_2=\mu(\sigma_{ij}^2(t)>\mu(\sigma_{ij}^2(t)))$$

Finally, the pixel noise estimate is a mean over all pixel variances that are less than $\mu_2$:

$$p=\mu(\sigma_{ij}^2(t)<\mu_2)$$

The current frame is then gridded into an array $G(f_t)$ of subarrays from the original pixel array (step 60). A size of each subarray is pre-selected to be equal to a specified angular size of a typical swarm.

Each subarray $g_t$ (derived from image data acquired at time t) is extracted from array $G(f_t)$ (step 62) and then processed in sequence.

For each subarray, pixel values are extracted from successive frames to form a swarm window $W_g(t)$. The swarm window $W_g(t)$ is a time window associated with each subarray $g$, (also referred to hereinafter as $g(t)$) containing the last m subarrays $\{g(t-m), \ldots, g(t)\}$ at this grid up to the present time t. At this step and the next, the new subarray $g(t)$ is added to an old time window $W_g(t-1)$ (step 64) and the oldest subarray $g(t-m-1)$ is deleted (step 66), leaving the current set $W_g(t)=\{g(t-m+1), \ldots, g(t)\}$.

A sequence of pixel angular velocities is chosen $\{(vx_1, vy_1), (vx_2, vy_2), \ldots, (vx_d, vy_d)\}$ that spans the range of angular pixel velocities for the objects being tracked (step 68). The machine vision processing unit assumes that the angular velocity range is between −1 and +1 pixel per frame in both directions.

Then a swarm angle tracking module computes a respective swarm detection metric $S_W(v)=S_W(vx, vy)$ for the current subarray $g(t)$ and each selected angular velocity v (step 70). The swarm detection metric is a measure of the degree to which a multiplicity of pixel values in a subarray of a sequence of frames change over time in a manner that is indicative of swarm motion, such as flying in formation. This swarm detection metric computation is performed by executing the swarm angle tracking algorithm described in more detail below.

If the swarm detection metric $S_W(v)$ is above a chosen threshold T that gives a desired false alarm rate, then a signal indicating that a swarm has been detected is produced and sent to an alert activation module for each detected swarm (step 72). The signal output to the alert activation module includes digital data representing the angular position of the subarray g containing the pixels representing the detected swarm and digital data representing the angular velocity v of the pixels representing the detected swarm within that subarray g.

The final section shown in FIG. 2 is the process of alarming or alerting for possible collisions with detected swarms. The process for activating an alarm (step 78) is specific to each aircraft or is part of airport operation, but in general the process would extrapolate the swarm angular position a given number of seconds s into the future (time t+s) assuming the swarm's current angular position g and current angular velocity v. A determination is made whether this extrapolated (future) angular position (in the frame of reference of the grid array) is within a future angular collision region (in the frame of reference of the grid array) or not (step 74). (The future angular collision region typically corresponds to a region around the current heading of the aircraft or a predicted or allocated future track of the aircraft at a time which is s seconds in the future.) On the one hand, if a determination is made in step 74 that the extrapolated angular position is not within the future angular collision region, then the alarm is not activated (step 80). On the other hand, if a determination is made in step 74 that the extrapolated angular position is within the future angular collision region, then a determination is made whether s>S or not (step 76), where S is a chosen alarm time that allows for either maneuvering or otherwise changing the flight plan. If s>S (meaning that there is sufficient time for the pilot to take evasive action), then an alert or alarm would be passed to the relevant party or system (step 78). If s is not greater than S, then the alarm is not activated (step 80).

The swarm detection metric $S_W(v)=S_W(vx, vy)$ is computed on a swarm window $W_g$ with the set of m frame times $$f \in \{t-m+1, t-m+2, \ldots, t\}$$

and the last m subarrays $\{g(t-m+1), g(t-m+2), \ldots, g(t)\}$ up to the present time for the current subarray g and the selected angular velocity v. As previously mentioned, the assumption is made that the pixel angular velocity (motion in pixels per second) is bounded by $-1 \le vx$ and $vy \le 1$. First, the way that the swarm detection metric works for a one-dimensional N×1 pixel grid (each subarray g(f) is a N×1 pixel grid) with a dark (high value) pixel object will be described. Then an indication how this technique works for two-dimensional pixel arrays will be provided. In what follows, the parameter v represents the one-dimensional angular velocity.

For each pixel index r in the one-dimensional subarray g(f) at time $f$, the processor uses as input both the pixel value $c_r(f)$ and the interpolated pixel value $$\langle c_r(f) \rangle_v,$$

which is computed based on this pixel and its neighbor as $$\langle c_r(f) \rangle_v = v c_{r-sgn(v)}(f) + (1-v) c_r(f)$$

where sgn(v) denotes 1 if v>0 and −1 if v<0. Also the processor uses as input the same pixel values from the previous time f−1, i.e., $c_r(f-1)$ and the interpolated pixel value $$\langle c_r(f-1) \rangle_v$$

The processor then computes the swarm detection metric array d (of size N×m) recursively over time from these values over the swarm window as $$d_r(f)=d_r(f-1)+\max\{(\langle c_r(f) \rangle_v - \langle c_r(f-1) \rangle_v - (c_r(f)-c_r(f-1)), 0\}$$

where $$f \in \{t-m+1, t-m+2, \ldots, t\}$$

and $d_r(t-m)=0$, i.e., the metric starts at zero at the beginning of this recursive computation.

Figure 3:
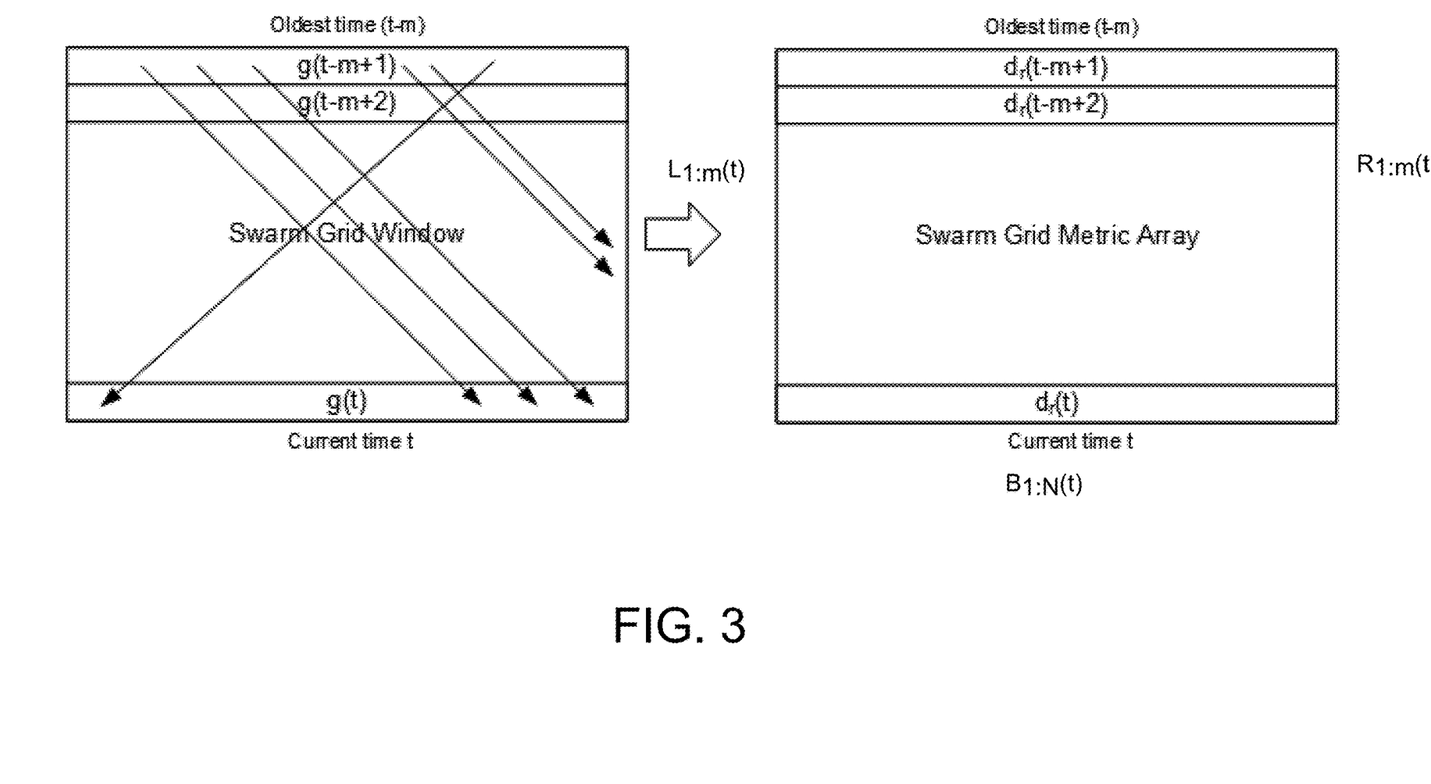
FIG. 3 is a diagram showing a swarm grid window and a corresponding swarm detection metric array for a one-dimensional grid.

FIG. 3 is a diagram showing a swarm grid window (on the left-hand side) and a corresponding swarm detection metric array (on the right-hand side) for a one-dimensional subarray. More specifically, FIG. 3 shows pictorially how the swarm detection metric d is computed over time for a one-dimensional subarray. Each row in the swarm grid window represents pixel data acquired by the one-dimensional subarray g at a respective time, with the oldest (in time) pixel data being in the uppermost row and most recent (current) pixel data in the lowermost row. The arrows in the swarm grid window (on the left-hand side of FIG. 3) indicate the velocity of six objects, one moving leftward and the other five moving rightward. On the right-hand side of FIG. 3, the labels $L_{1:m}(t)$ and $R_{1:m}(t)$, respectively indicate the left and right boundaries of the swarm detection metric array, while the label $B_{1:N}(t)$ indicates the bottom boundary of the swarm detection metric array. The swarm detection metric array may be depicted on a three-dimensional graph of the type seen in FIGS. 4 and 5, in which the horizontal axes indicate the one-dimensional pixel count and the frame count respectively, while the vertical axis indicates the value of the swarm detection metric as a function of pixel number and frame count. The swarm detection metric (shown before computing the final average of the mean above the mean) is computed in the final step by using the bottom boundary $B_{1:N}(t)$ and the right boundary $R_{1:m}(t)$ of the swarm detection metric array (because the velocity is positive in this example). The swarm detection metric shown in FIG. 3 is not normalized to illustrate the necessity of normalization.

It may be appreciated that N is the number of pixels in the one-dimensional subarray, while m is the number of time steps in the swarm calculation. Thus, there are m time steps for the left and right metrics and N pixels for the bottom metric. So the left and bottom sides of the computation represented in FIG. 3 have a total of N+m values; similarly, the right and bottom sides of the computation have a total of N+m values.

Figure 4:
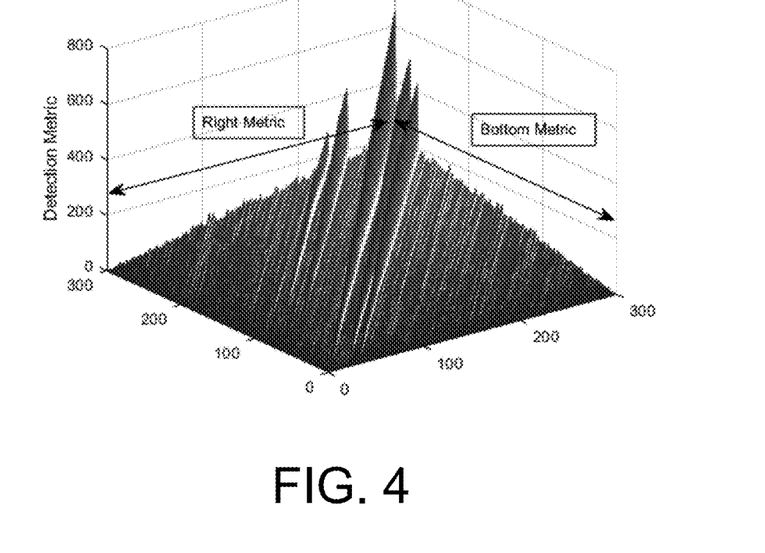
FIG. 4 is a three-dimensional graph of the swarm detection metric as a function of frame count and one-dimensional pixel number showing how swarm detections resulted over time in a simulation wherein the velocity was assumed to be between −1 and 1 pixel per frame in both directions.
Figure 5:
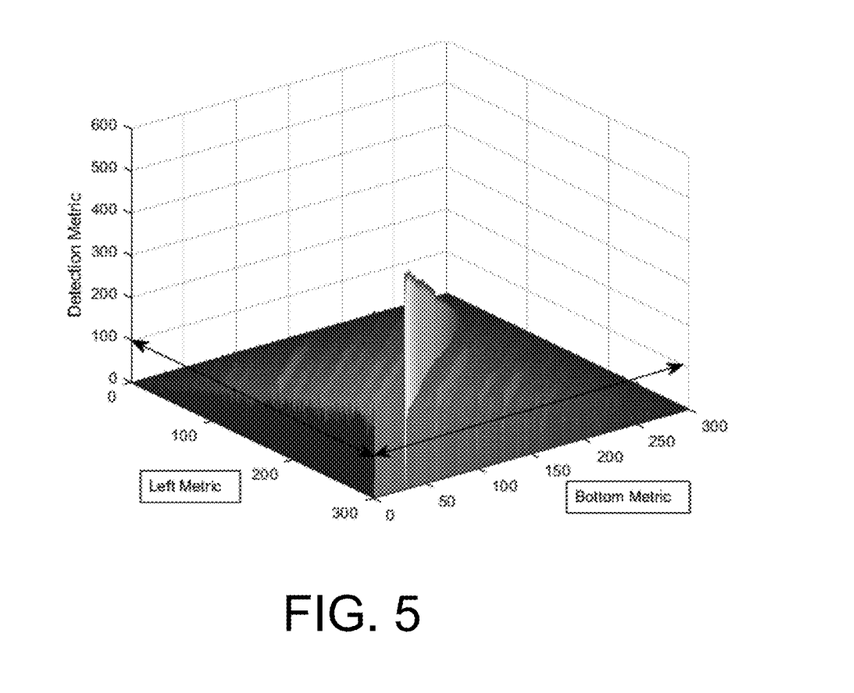
FIG. 5 is a three-dimensional graph of the detection metric as a function of one-dimensional pixel number and frame count showing how swarm detections resulted over time in a simulation wherein the velocity was assumed to be between −1 and 1 pixel per frame in both directions.

FIGS. 4 and 5 show results of a simulation in which the swarm detection metric array d was computed over time for a swarm window of length 300 and a one-dimensional pixel subarray of length 300 (in general, the pixel length and time length of the swarm window do not have to be the same value), where six different object motions have been inserted in the subarray. Five of the six motions have a velocity equal to 1 pixel/frame and are clearly detected by the swarm detection metric shown in FIG. 4. The sixth object is a single object motion going the opposite direction (velocity equal to −1 pixel/frame) in the same subarray. FIG. 5 shows that the reverse motion is also detected (but none of the other five objects are seen, showing the discrimination power of the swarm detection metric).

Figure 6:
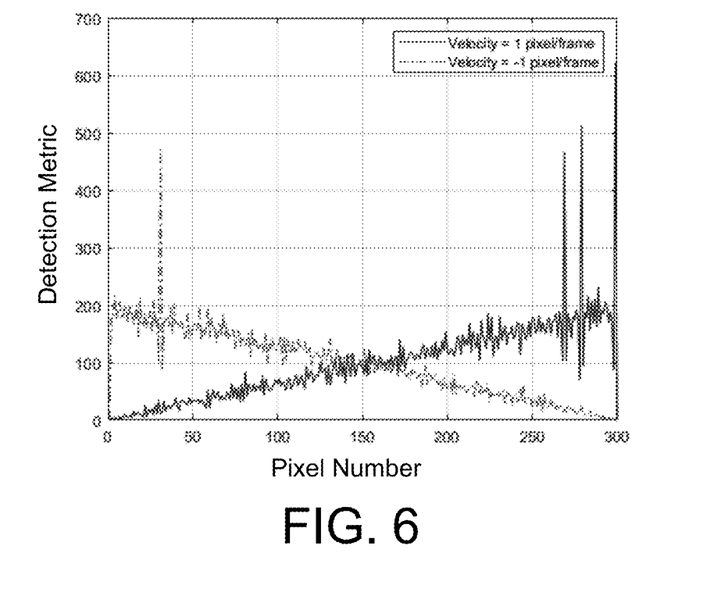
FIG. 6 is a graph showing swarm detection metric values along a bottom boundary of a swarm detection metric array after 300 frames with subpixel noise at object/noise equal to −5 dB in the simulation. The solid line indicates the metric for a velocity of 1 pixel/frame; the dash-dot line indicates the metric for a velocity of −1 pixel/frame.
Figure 7:
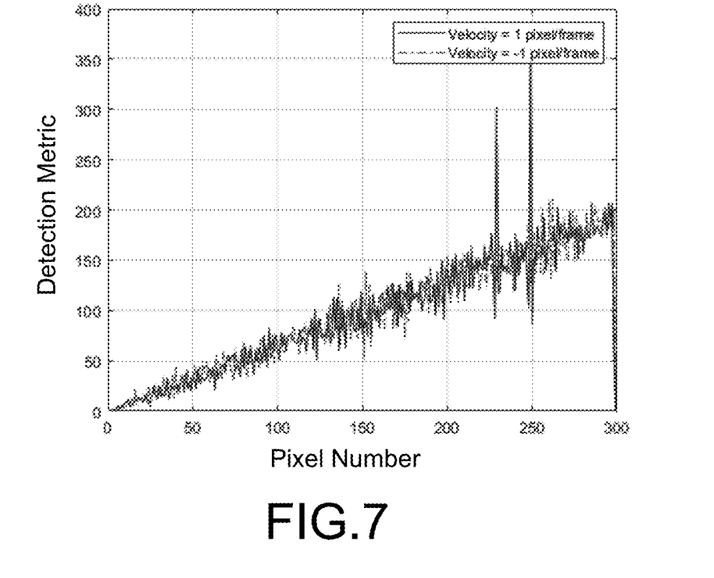
FIG. 7 is a graph showing swarm detection metric values along a positive velocity boundary of a swarm detection metric array with subpixel noise at object/noise equal to −5 dB in the simulation. The solid line indicates the metric for a velocity of 1 pixel/frame; the dash-dot line indicates the metric for a velocity of −1 pixel/frame.

The third step in the swarm detection process is to capture the swarm detection metric from the left, right and bottom boundaries (see L, R and B defined below) of the swarm detection metric array. FIGS. 6 and 7 are graphs showing swarm detection metric values along a bottom boundary and along a positive velocity boundary respectively after 300 frames with subpixel noise at object/noise equal to −5 dB in the simulation. The solid line indicates the metric for a velocity of 1 pixel/frame; the dash-dot line indicates the metric for a velocity of −1 pixel/frame. The peaks from each of the six moving objects can be clearly seen. Thus, the final step is to capture the boundary values of the swarm detection metric array for this swarm grid window to form the final swarm detection metric. Specifically, the current time boundary (bottom side) would be $d_{1:N}(t)$ (this is used by all velocity values v); the positive velocity pixel boundary (right side) would be $d_N(1:m)$ (this is used by positive velocity values v≥0); and the negative velocity pixel boundary (left side) would be $d_1(1:m)$ (this is used by negative velocity values v<0).

The swarm detection metric is computed using the pixel noise p computed above. Specifically, the swarm detection metric $S_W(v)$ is computed from a one-dimensional boundary array defined as the concatenation of two of the three vectors which have been normalized to eliminate the non-constant noise floor. These three vectors are:

For j=1:N, set $B_j(t)=d_j(t)-\min(m-v(m-j), m)p^{1/2}$ for v≥0 $(d_j(t)-\min(m+v(j), m)p^{1/2}$ for v<0).

For j=1:m, set $R_j(t)=d_N(j)-(m-v(m-j))p^{1/2}$ for v≥0 $(d_N(j)-(m+v(j))p^{1/2}$ for v<0).

For j=1:m, set $L_j(t)=d_1(j)-(m-v(m-j))p^{1/2}$ for v≥0 $(d_1(j)-(m+v(j))p^{1/2}$ for v<0).

Then the swarm detection metric $S_W(v)$ is defined as follows. Take the number of values $C_W(v)$ of the following vectors of length N+m that are greater than the mean above their mean:

$[B_{1:N}(t),R_{1:m}(t)]$ for v≥0

$[L_{1:m}(t),B_{1:N}(t)]$ for v<0

Then $S_W(v)=C_W(v)/(N+m)$.

What has been described is for a one-dimensional N×1 subarray as the grid. For a general N×M subarray, the angular velocity v and index r would have two components, the swarm detection metric array d would be of size N×M×m, and the mean above the mean would be computed over a two-dimensional boundary array instead.

Each embodiment disclosed herein comprises one or more sensors, a computer system configured (e.g., programmed) to process image data, and an alert system for informing the pilot of a potential collision. In accordance with one embodiment, the sensor is a video camera mounted to the aircraft or to a tower on the ground and the computer system is a machine vision processing unit. The machine vision processing unit is configured to process the image data captured by the camera using the swarm angle tracking algorithm disclosed herein. The camera may be a visible light camera, an infrared camera or some combination that would allow day and night operation. Various known mountings for these cameras can be employed and are not described in detail herein. As will be readily appreciated by those skilled in camera systems, various types of cameras may be used, for example, low-light or infrared/thermal cameras could be used for night operations.

The aircraft 10 may be moving along a path (e.g., on a runway or in the air). A swarm of small flying objects (not shown in FIG. 1) may be moving along the same or a different (e.g., intersecting) path. Depending upon the relative positions and/or relative movements of the aircraft 10 and/or the swarm, a risk may exist that the aircraft 10 will collide with some members of the swarm. The collision avoidance system disclosed herein may be installed on an aircraft of a type different than the type depicted in FIG. 1. For example, the aircraft may be a commercial passenger aircraft operated by an airline, a cargo aircraft operated by a private or public entity, a military aircraft operated by a military or other government organization, a personal aircraft operated by an individual, or any other type of aircraft operated by any other aircraft operator.

Figure 8:
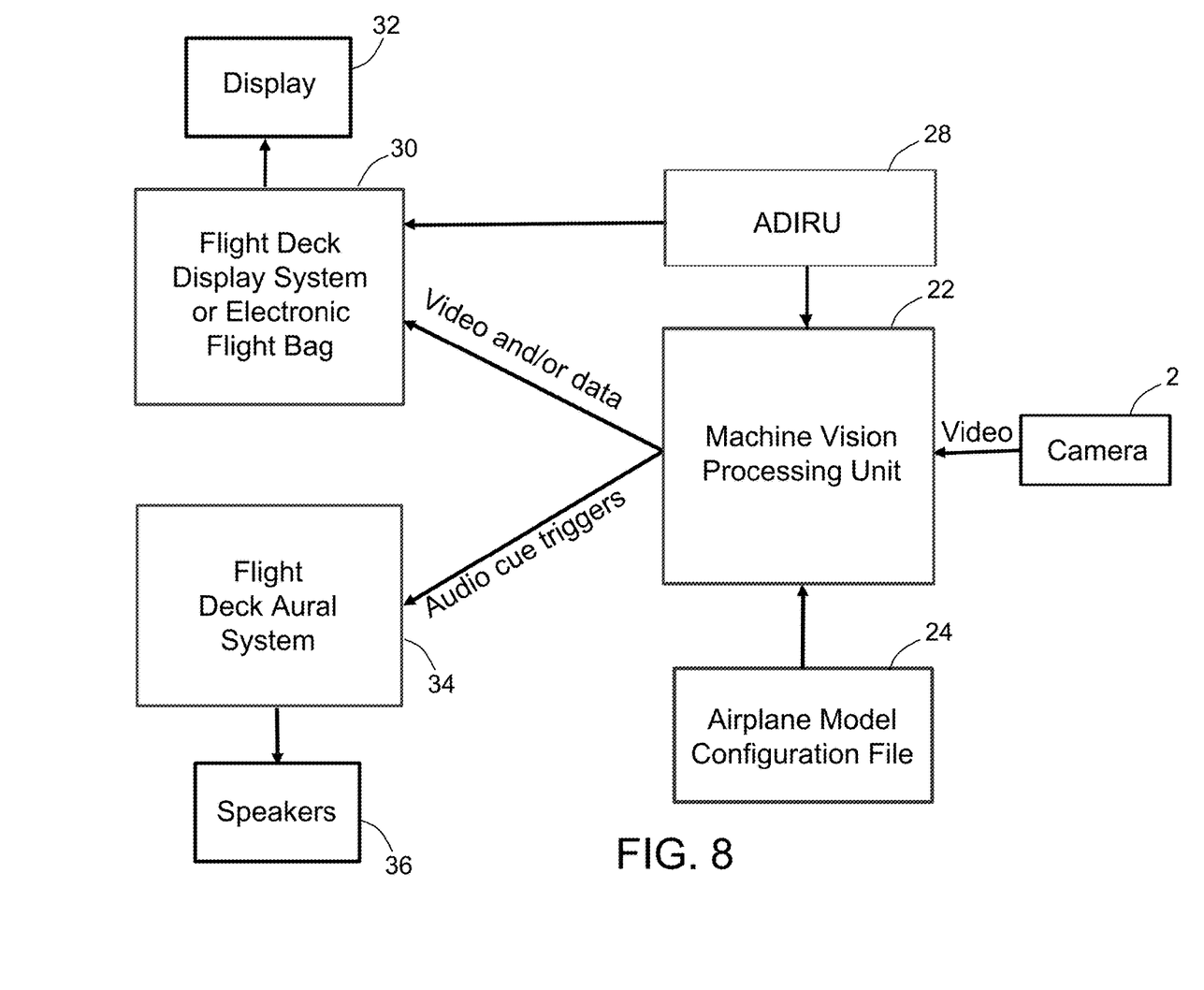
FIG. 8 is a block diagram identifying components of an object detection and collision avoidance system situated on board the aircraft depicted in FIG. 1, which system comprises a camera mounted to a nose of an aircraft and a machine vision processing unit configured (e.g., programmed) to process acquired image data using a swarm angle tracking algorithm.

In accordance with one embodiment, the object detection and collision avoidance system further comprises the additional components identified in FIG. 8, including a machine vision processing unit 22 that is located inside the aircraft fuselage, but is communicatively coupled to a camera 2 (or multiple cameras) so that image data in the form of respective streams of video frames is received from the camera 2. The machine vision processing unit 22 can be configured to recover three-dimensional shape and color information from captured images of objects using any one of a number of methods known in the art.

In accordance with one embodiment, the machine vision processing unit 22 comprises a computer system that executes software configured to process the received image data to determine whether any swarm in proximity poses a risk of collision. In addition, the software executed by the machine vision processing unit 22 is configured to calculate a range to each potentially colliding swarm that appears in the field of view of camera 2 based on the image data in the video frames acquired by the one or more cameras and further based on aircraft geometry data retrieved from an airplane model configuration file 24 and aircraft state data (e.g. groundspeed, heading) received from an air data inertial reference unit 28 (ADIRU in FIG. 8). The airplane model configuration file 24 contains information about the specific aircraft model (such as aircraft dimensions) that is needed for determining if/when indications need to be raised in the flight deck. The aircraft dimensions describe the size and shape of the whole exterior of the aircraft.

The machine vision processing unit 22 executes instructions stored in a non-transitory tangible computer-readable storage medium (not shown in FIG. 8) such as an internal data storage unit, an external data storage unit, or a combination thereof. The machine vision processing unit 22 may comprise any one of various types of data processing technology. For example, the machine vision processing unit 22 may comprise a dedicated-purpose electronic processor or a general-purpose computer. Other types of processors and processing unit technologies are possible. Likewise the non-transitory tangible computer-readable storage medium may comprise any one of various types of data storage technology. For examples, the non-transitory tangible computer-readable storage medium may comprise random access memory, read only memory, solid state memory, or any combination thereof. Other types of memories and data storage unit technologies are possible.

In accordance with one proposed implementation, the machine vision processing unit 22 comprises a computer system that executes software configured to process successive video frames. More specifically, the current frame is gridded into an array of subarrays which are roughly the angular size of a typical swarm. Each subarray extracted from array and then processed in sequence using the swarm angle tracking algorithm to detect when a swarm has appeared in the image and then determine the current angular position and angular velocity of that swarm. The machine vision processing unit 22 is further configured to extrapolate the swarm angular position at a future time based on the swarm's current angular position and angular velocity and then determine whether this extrapolated angular position is within an angular collision region.

If the machine vision processing unit 22 determines that the extrapolated angular position is within an angular collision region and that there is sufficient time to maneuver the aircraft to avoid the collision, an alert is activated. When a detection threshold is surpassed, an aural cue trigger signal is sent to a flight deck aural system 34, which is thereby activated to sound a cue through speakers 36. The particular aural cue sounded is a function of the degree of proximity of the object or the nearness of a potential collision. In accordance with one implementation, as the time to collision decreases, respective detection thresholds are surpassed which trigger respective aural indicators representing respective risk levels. For example, a pilot warning can be sounded based on the nearness of the potential collision, with more imminent collisions having louder (i.e., greater volume or amplitude) or faster (i.e., greater repetition rate) aural cues.

Still referring to FIG. 8, the machine vision processing unit 22 also records the images from the camera 2. The image sequence is sent to a flight deck display system or electronic flight bag 30 and then displayed on a cockpit display 32 for viewing by the pilot. In addition, the machine vision processing unit 22 may be configured to send time-to-collision data to flight deck display system or electronic flight bag 30 for display on cockpit display 32.

The machine vision processing unit 22 may execute code of various software modules stored in a non-transitory tangible computer-readable storage medium. The machine vision processing unit 22 may comprise a multiplicity of processing units that execute code of respective software modules. Coded instructions to implement the detection method may be stored in a mass storage device, in a volatile memory, in a non-volatile memory, and/or on a removable non-transitory tangible computer-readable storage medium such as an optical disk for storing digital data.

The swarm angle tracking algorithm may be implemented using machine-readable instructions that comprise a program for execution by the machine vision processing unit 22. The program may be embodied in software stored on a non-transitory tangible computer-readable storage medium such as an optical disk, a floppy disk, a hard drive or a memory associated with the collision avoidance processor, but the entire program and/or parts thereof could alternatively be executed by a device embodied in firmware or dedicated hardware.

Optionally, a process for modeling the structure of bird flocks or drone warms may be performed. From a modeling study using the wing span of the flying object as the modeling parameter, the cumulative frequency of striking a given number of birds for 1,000 passes of a 100-inch diameter jet engine through each of the flocks may be modeled. From this and other studies, the danger of each type of bird, size of typical flocks, migration behaviors and many other factors can be used to adjust the parameters for the system disclosed herein. Such factors will influence the grid size, the camera region of interest, the detection and alarm thresholds, etc.

The aircraft-mounted swarm detection and collision avoidance system disclosed herein may be implemented by hardware, software, firmware and/or any combination of hardware, software and/or firmware. Thus, for example, the aircraft-mounted swarm detection and collision avoidance system could be implemented using analog or digital circuits, logic circuits, programmable processors, application-specific integrated circuits, programmable logic devices or field-programmable logic devices.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

While systems and methods for tracking swarms of flying objects for collision avoidance have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore, it is intended that the claims set forth hereinafter not be limited to the disclosed embodiments.

As used herein, the term "computer system" should be construed broadly to encompass a system having at least one computer or processor, and which may have multiple computers or processors that are communicatively coupled by means of a network or bus. As used in the preceding sentence, the terms "computer" and "processor" both refer to devices comprising a processing unit (e.g., a central processing unit) and some form of memory (e.g., non-transitory tangible computer-readable storage medium) for storing a program which is readable by the processing unit. As used herein, the term "camera system" should be construed broadly to encompass a single camera or multiple cameras having at least partially overlapping fields of view.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. A system for warning a pilot of a risk of collision during flight of an aircraft, the system comprising:
    a camera system having a viewpoint and a field of view that includes a volume of space forward of an aircraft in flight, the camera system being configured to capture frames of pixel data representing successive images of objects in the volume of space in response to activation of an image acquisition mode;
    an alert system on a flight deck of the aircraft capable of generating an alert; and
    a computer system configured to perform operations comprising:
    (a) processing the frames to determine whether the pixel data is indicative of presence of a swarm of flying objects in the volume of space or not;
    (b) determining a current angular velocity and a current angular position of the swarm based on the pixel data in response to a determination in processing operation (a) that a swarm is present;
    (c) extrapolating a future angular position of the swarm based on the current angular velocity and current angular position of the swarm;
    (d) determining whether the future angular position of the swarm is within an angular collision region or not; and
    (e) triggering the alert system to produce an alert following a determination in operation (d) that the future angular position of the swarm is within the angular collision region,
    wherein operation (a) comprises gridding each frame of pixel data into an array of subarrays, a size of each subarray being equal to a specified angular size of a swarm.

2. The system as recited in claim 1, wherein the computer system is further configured to determine whether a future time of intersection of the swarm and the aircraft is greater than a minimum time for collision avoidance, and wherein operation (e) comprises triggering the alert system if the future angular position of the swarm is within the angular collision region and if the future time of intersection is greater than the minimum time for collision avoidance.

3. The system as recited in claim 1, wherein the computer system comprises:
    a swarm angle tracking module that performs operations (a) and (b), and
    an alert activation module that performs operations (c) through (e).

4. The system as recited in claim 1, wherein operation (a) further comprises detecting that a multiplicity of pixel values in a subarray of a sequence of frames change over time in a manner that is indicative of swarm motion.

5. The system as recited in claim 1, wherein operation (a) further comprises for each subarray:
    extracting pixel values from a sequence of frames to form a swarm window;
    selecting a sequence of pixel angular velocities;
    computing a swarm detection metric for each pixel angular velocity selected;
    comparing each swarm detection metric to a specified threshold that gives a desired false alarm rate; and
    producing a signal indicating that a swarm has been detected to the alert activation module for each detected swarm, wherein the signal produced includes first digital data representing the angular position of a subarray containing pixels representing the swarm detected and second digital data representing an angular velocity of the pixels representing the swarm detected.

6. The system as recited in claim 5, wherein the swarm detection metric is a measure of a degree to which a multiplicity of pixel values in a subarray of a sequence of frames change over time in a manner that is indicative of swarm motion.

7. The system as recited in claim 5, wherein the swarm detection metric for each subarray is computed on a swarm window with a multiplicity of frame times for a selected pixel angular velocity.

8. The system as recited in claim 7, wherein the swarm detection metric for each subarray is computed recursively over time using as input a multiplicity of pixel values and interpolated pixel values derived from the multiplicity of pixel values.

9. A method for warning a pilot of a risk of collision during flight of an aircraft, the method comprising:
    (a) capturing frames of pixel data representing successive images of objects in a volume of space using at least one camera;
    (b) processing the frames in a computer system to determine whether the pixel data is indicative of presence of a swarm of flying objects in the volume of space or not;
    (c) determining a current angular velocity and a current angular position of the swarm based on the pixel data in response to a determination in step (b) that a swarm is present;
    (d) extrapolating a future angular position of the swarm based on the current angular velocity and current angular position of the swarm;
    (e) determining whether the future angular position of the swarm is within an angular collision region or not; and
    (f) producing an alert following a determination in step (e) that the future angular position of the swarm is within the angular collision region,
    wherein step (b) comprises gridding each frame of pixel data into an array of subarrays, a size of each subarray being equal to a specified angular size of a swarm.

10. The method as recited in claim 9, further comprising determining whether a future time of intersection of the swarm and the aircraft is greater than a minimum time for collision avoidance, and wherein step (f) comprises producing the alert if the future angular position of the swarm is within the angular collision region and if the future time of intersection is greater than the minimum time for collision avoidance.

11. The method as recited in claim 9, wherein the computer system comprises:
    a swarm angle tracking module that performs operations (a) and (b), and an alert activation module that performs operations (c) through (e).

12. The method as recited in claim 9, wherein step (b) further comprises detecting that a multiplicity of pixel values in a subarray of a sequence of frames change over time in a manner that is indicative of swarm motion.

13. The method as recited in claim 9, wherein step (b) further comprises for each subarray:
extracting pixel values from a sequence of frames to form a swarm window;
selecting a sequence of pixel angular velocities;
computing a swarm detection metric for each pixel angular velocity selected;
comparing each swarm detection metric to a specified threshold that gives a desired false alarm rate; and
producing a signal indicating that a swarm has been detected to the alert activation module for each detected swarm, wherein the signal produced includes first digital data representing the angular position of a subarray containing pixels representing the swarm detected and second digital data representing an angular velocity of the pixels representing the swarm detected.

14. The method as recited in claim 13, wherein the swarm detection metric for each subarray is computed on a swarm window with a multiplicity of frame times for a selected pixel angular velocity.

15. The method as recited in claim 14, wherein the swarm detection metric for each subarray is computed recursively over time using as input a multiplicity of pixel values and interpolated pixel values derived from the multiplicity of pixel values.

16. An aircraft comprising:
a camera directed in a forward direction along a centerline of the aircraft and having a field of view that includes a volume of space that is forward of the aircraft during flight, the camera being configured to capture frames of pixel data representing successive images of objects in the volume of space in response to activation of an image acquisition mode;
a flight deck of the aircraft comprising an alert system capable of generating an alert; and
a computer system configured to perform operations comprising:
(a) processing frames received from the camera to determine whether the pixel data is indicative of presence of a swarm of flying objects in the volume of space or not;
(b) determining a current angular velocity and a current angular position of the swarm based on the pixel data in response to a determination in processing operation (a) that a swarm is present;
(c) extrapolating a future angular position of the swarm based on the current angular velocity and current angular position of the swarm;
(d) determining whether the future angular position of the swarm is within an angular collision region or not; and
(e) triggering the alert system to produce an alert following a determination in operation (d) that the future angular position of the swarm is within the angular collision region,
wherein operation (a) comprises:
gridding each frame of pixel data into an array of subarrays, a size of each subarray being equal to a specified angular size of a swarm; and
detecting that a multiplicity of pixel values in a subarray of a sequence of frames change over time in a manner that is indicative of swarm motion.

17. The aircraft as recited in claim 16, wherein the computer system is further configured to determine whether a future time of intersection of the swarm and the aircraft is greater than a minimum time for collision avoidance, and wherein operation (e) comprises triggering the alert system if the future angular position of the swarm is within the angular collision region and if the future time of intersection is greater than the minimum time for collision avoidance.

18. The system as recited in claim 16, wherein operation (a) further comprises for each subarray:
extracting pixel values from a sequence of frames to form a swarm window;
selecting a sequence of pixel angular velocities;
computing a swarm detection metric for each pixel angular velocity selected;
comparing each swarm detection metric to a specified threshold that gives a desired false alarm rate; and
producing a signal indicating that a swarm has been detected to the alert activation module for each detected swarm, wherein the signal produced includes first digital data representing the angular position of a subarray containing pixels representing the swarm detected and second digital data representing an angular velocity of the pixels representing the swarm detected.

19. The system as recited in claim 18, wherein the swarm detection metric is a measure of a degree to which a multiplicity of pixel values in a subarray of a sequence of frames change over time in a manner that is indicative of swarm motion.

20. The system as recited in claim 18, wherein the swarm detection metric for each subarray is computed on a swarm window with a multiplicity of frame times for a selected pixel angular velocity.

* * * * *